(12) United States Patent
Gross et al.

(10) Patent No.: US 7,653,276 B1
(45) Date of Patent: Jan. 26, 2010

(54) COMPOSITE STRUCTURES FOR STORING THERMAL ENERGY

(75) Inventors: Adam F. Gross, Los Angeles, CA (US); Ronald M. Finnila, Santa Barbara, CA (US); Alan J. Jacobsen, Los Angeles, CA (US); Robert Cumberland, Malibu, CA (US); Sky L. Skeith, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 78 days.

(21) Appl. No.: 12/075,033

(22) Filed: Mar. 6, 2008

(51) Int. Cl.
*G02B 6/26* (2006.01)
*G02B 6/255* (2006.01)

(52) U.S. Cl. .......................................... 385/46; 385/95
(58) Field of Classification Search .................. 385/46, 385/95–99, 129–132
See application file for complete search history.

(56) References Cited

U.S. PATENT DOCUMENTS 7,382,959 B1 * 6/2008 Jacobsen .................... 385/129

* cited by examiner

*Primary Examiner*—Charlie Peng
(74) *Attorney, Agent, or Firm*—Christie, Parker, Hale

(57) ABSTRACT

A composite structure for storing thermal energy. In one embodiment, an apparatus for storing thermal energy includes: a thermal storage material and a three-dimensional structure. The three-dimensional structure includes: a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction. The first, second, and third truss elements interpenetrate each other at a plurality of nodes to form a continuous material. The first, second, and third truss elements define an open space. The thermal storage material occupies at least a portion of the open space, and the three-dimensional structure is self-supporting.

15 Claims, 16 Drawing Sheets

COMPOSITE STRUCTURES FOR STORING THERMAL ENERGY

FIELD OF THE INVENTION

The present invention relates to three-dimensional composite structures for storing thermal energy.

BACKGROUND OF THE INVENTION

Heat storage devices can be fabricated from a phase change material that can be a salt hydrate or an organic molecule and a container. The phase change material is placed in a tank or melted into a high thermal conductivity porous structure that is in a container. When the container absorbs heat, the phase change material absorbs the heat and melts if the temperature is above the phase change temperature. When the temperature drops below the phase change temperature, the material goes through a reverse phase change and releases heat. This is advantageous because a reduced weight and smaller heat sink may be used in a device as not all the heat must be radiated. However, in most thermal storage devices, extra weight is added to a component because heat storage devices cannot support weight and must be bolted onto the supporting structure rather than being part of it.

Also, heat exchangers transfer heat from a fluid or air stream to another fluid or air stream. They work best when they contain narrow pores (under 0.5 mm in diameter) with high aspect ratios. Pores with a large aspect ratio and small diameter are difficult to form.

Furthermore, heat storage systems may use a graphite felt or metal tank to move heat between an exterior environment and a phase change material; however, the tanks and graphite felt do not support the structure of the vehicle or component in which they are integrated. Additionally, these materials are not templated from a supporting structure that efficiently uses space to maximize the amount of phase change or thermal storage material to be contained and/or stored while remaining mechanically robust.

Heat exchangers may also be formed from a porous foam or honeycomb to transfer heat between two materials. However, for such heat exchangers, it may be difficult to fabricate high aspect ratio thin diameter pores with porosity of the desired dimensions.

SUMMARY OF THE INVENTION

Aspects of embodiments of the present invention are directed towards three-dimensional composite structures that may function as heat storage units, heat batteries, or heat exchangers.

An embodiment of the present invention provides a heat storage composite that includes a scaffold that can act as a weight bearing material and transfer heat throughout the composite while also encapsulating a phase change material. The scaffold may be part of the walls of a structure or be the enclosure for a thermal source. The scaffold may be formed by a light based process. The light based process used to create the original polymer scaffold determines the structure of the scaffold supporting the composite. The rods of the scaffold may be used as a template to create hollow tubes of metal or ceramic. The outside of the metal or ceramic tubes will be filled with a liquid, phase change material, or gas to transfer the removed heat.

Another embodiment of the present invention utilizes a polymer scaffold to control the geometry of pores to provide pores with a large aspect ratio and small diameter. That is, heat exchangers based on the polymer scaffold according to an embodiment of the present invention have a unique geometry for their pores.

In one embodiment of the present invention, an apparatus for storing thermal energy includes: a thermal storage material and a supporting scaffold (i.e., a three-dimensional structure). The supporting scaffold may be an optically templated polymer, graphite, or metal scaffold filled with a solid or liquid thermal storage material for storing heat. The composite may be used as a weight or force bearing part of a structure. Thermal energy may be stored by changing the temperature of the thermal (or heat) storage material or by the thermal storage material undergoing a phase change.

More specifically, in one embodiment of the present invention, an apparatus for storing thermal energy includes: a thermal storage material and a three-dimensional structure. The three-dimensional structure includes: a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction. The first, second, and third truss elements interpenetrate each other at a plurality of nodes to form a continuous material. The first, second, and third truss elements define an open space. The thermal storage material occupies at least a portion of the open space, and the three-dimensional structure is self-supporting.

At least one of the first, second, or third truss elements may include a chemically treated surface.

The chemically treated surface may include a material selected from the group consisting of a silane treated surface, a surfactant treated surface, and an amphoteric polymer treated surface.

The apparatus may further include a metal layer coating at least one portion of at least one of the first, second, or third truss elements and adapted to change a surface polarity of the at least one portion of the at least one of the first, second, or third truss elements.

The metal layer may include a material selected from the group consisting of nickel (Ni), copper (Cu), gold (Au), silver (Ag), ruthenium (Ru), platinum (Pt), rhodium (Rh), cobalt (Co), iron (Fe), and zinc (Zn).

The apparatus may further include a ceramic layer coating at least a portion of at least one of the first, second, or third truss elements and adapted to change a surface polarity of the at least one portion of the at least one of the first, second, or third truss elements.

The ceramic layer may include a material selected from the group consisting of silicon oxycarbide (SiOC), silicon carbide (SiC), silicon nitride (SiN), hafnium carbide (HfC), chromium carbide (CrC), boron nitride (B4N), cubic boron nitride (c-BN), hexagonal boron nitride (h-BN), and amorphous boron nitride (α-BN).

The thermal storage material may include a phase change material.

The phase change material may have a phase change characteristic at a temperature from about −20° C. to about 200° C.

The thermal storage material may include an organic material having a phase change characteristic at a temperature from about −20° C. to about 200° C.

The organic material may include a material selected from the group consisting of a hydrocarbon, a fatty acid, and a paraffin wax.

The thermal storage material may include a salt hydrate having a phase change characteristic at a temperature from about 0° C. to about 150° C. The salt hydrate may have a molecular formula of $A^yB^{-x}.zH_2O$, wherein A is a cation having a charge of y, B is an anion having a charge of −x, and z is an integer greater than or equal to 1.

The first, second, and third truss elements may be adapted to axially transfer a mechanical load applied to the apparatus.

Each of the first, second, and third truss elements may have an axial diameter from about 10 μm to about 0.5 mm.

According to another embodiment of the present invention, a method of forming an apparatus for storing thermal energy includes: securing a volume of a photo-monomer; securing a mask between at least one collimated light source and the volume of the photo-monomer, the mask having a plurality of apertures; directing a collimated light beam from the at least one collimated light source to the mask for a period of exposure time so that a portion of the collimated light beam passes through the mask and is guided by the plurality of apertures into the photo-monomer to form a plurality of waveguides through a portion of the volume of the photo-monomer; removing any uncured photo-monomer to leave behind a three-dimensional ordered polymer microstructure; and placing a thermal storage material at an open space of the three-dimensional ordered polymer microstructure.

The method may further include heating the three-dimensional ordered polymer microstructure such that a rigidity thereof is increased.

The method may further include applying a metal layer to at least one portion of at least one of the first, second, or third truss elements, the metal layer being adapted to change a surface polarity of the at least one portion of the at least one of the first, second, or third truss elements.

The method may further include applying a ceramic layer to at least one portion of at least one of the first, second, or third truss elements, the ceramic layer being adapted to change a surface polarity of the at least one portion of the at least one of the first, second, or third truss elements.

The method may further include chemically treating at least one portion of at least one of the first, second, or third truss elements, the chemical treatment being adapted to aid the placing of the thermal storage material.

BRIEF DESCRIPTION OF THE DRAWINGS

The accompanying drawings, together with the specification, illustrate exemplary embodiments of the present invention, and, together with the description, serve to explain the principles of the present invention.

The patent or application file contains at least one drawing/picture executed in color. Copies of this patent or patent application publication with color drawing/picture(s) will be provided by the Office upon request and payment of the necessary fee.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

Figure 1:
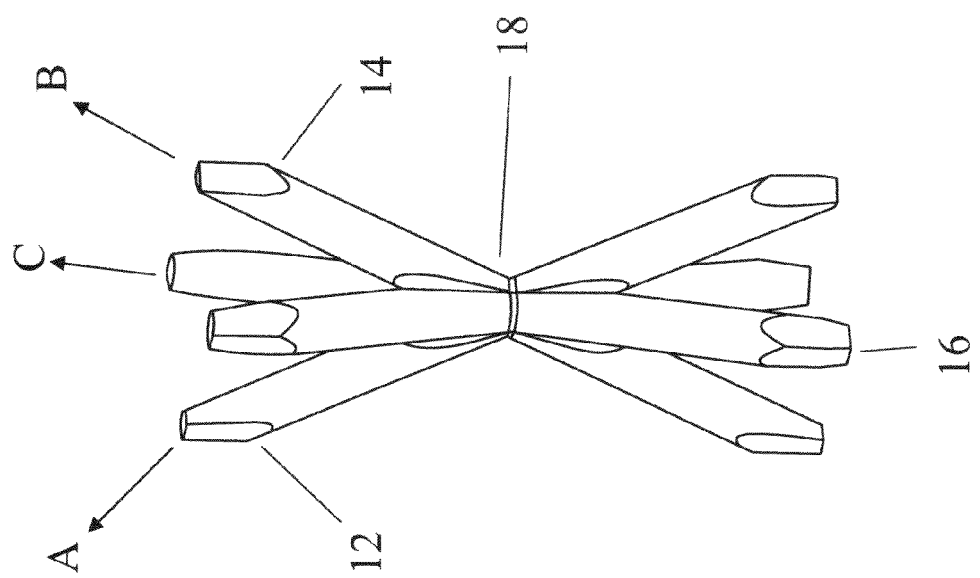
FIG. 1 is a perspective schematic view of a portion of a structure according to an embodiment of the present invention.
Figure 1:
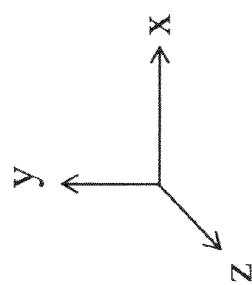
Figure 2:
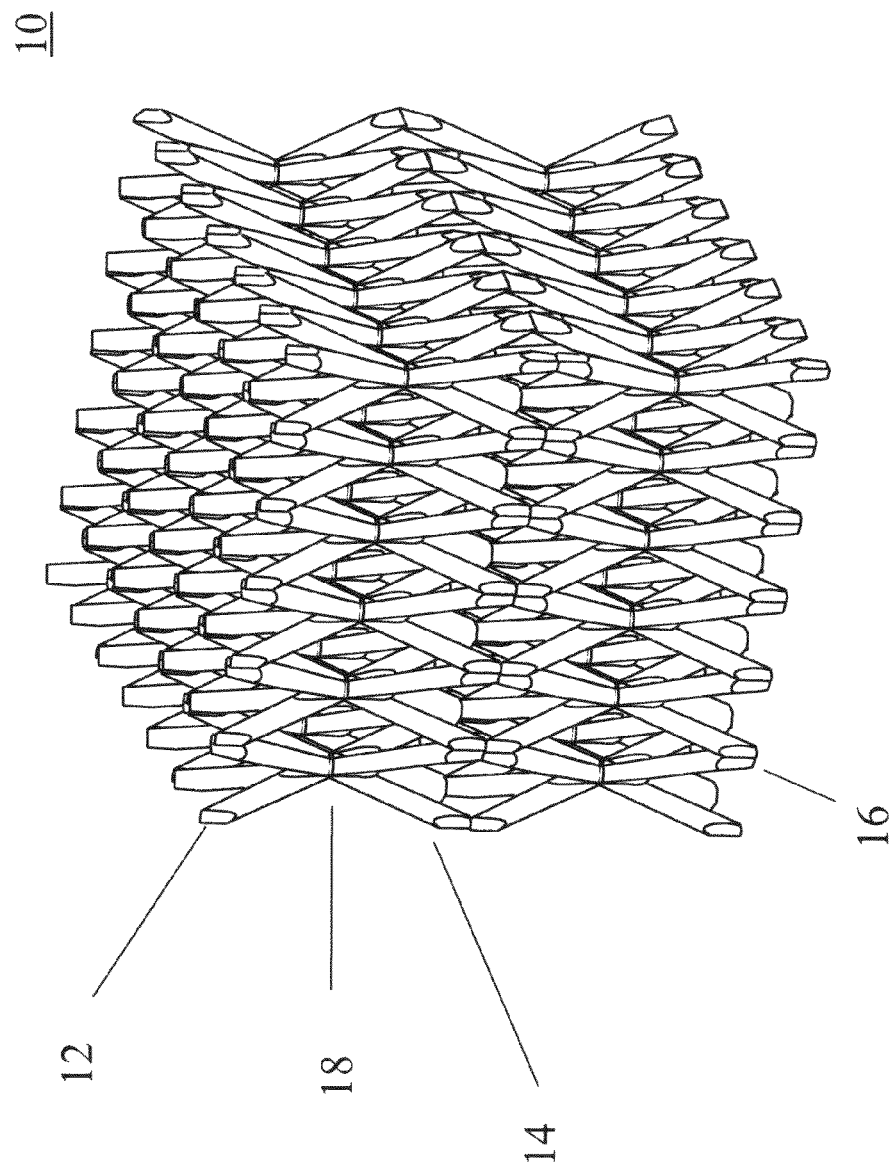
FIG. 2 is a perspective schematic view of a structure according to an embodiment of the present invention.

In the context of embodiments of the present invention, an ordered three-dimensional (3D) microstructure is referred to as an ordered 3D structure at the micrometer scale. Referring to FIGS. 1 and 2, a three-dimensional ordered open-cellular microstructure 10 according to an embodiment of the present invention is a self-supporting structure. In one embodiment of the present invention, this three-dimensional ordered open-cellular microstructure 10 can be utilized as a supporting scaffold (e.g., a polymer scaffold) in an apparatus for storing thermal energy that includes a thermal storage material and the supporting scaffold. The structure 10 includes first truss elements 12, second truss elements 14, and third truss elements 16. The first truss elements 12 are defined by first self-propagating polymer waveguides and extend along a first direction A. The second truss elements 14 are defined by second self-propagating polymer waveguides and extend along a second direction B. The third truss elements 16 are defined by third self-propagating polymer waveguides and extend along a third direction C. With reference to FIGS. 1 and 2, the truss elements 12, 14, 16 interpenetrate each other at nodes 18 to form a continuous material.

In one embodiment, the truss elements 12, 14, 16 include a photo-polymer material. In one embodiment, the truss elements 12, 14, 16 are polymer optical waveguide truss elements.

In one embodiment, the continuous material is continuously formed such that it lacks any interior boundaries, e.g., boundaries within the interpenetrating portions of truss elements 12, 14, 16. In another embodiment, each node 18 of the structure 10 is formed of the continuous material.

According to one embodiment of the present invention, the structure 10 is formed by using a fixed light input (collimated UV light) to cure (polymerize) polymer optical waveguides, which can self-propagate in a 3D pattern. As such, the propagated polymer optical waveguides form the structure 10.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with approximately the same cross-sectional dimensions along its entire length.

According to one embodiment of the present invention, a mask with a two-dimensional pattern of apertures (see FIG. 3) is used to create a three-dimensional polymer microstructure.

Figure 3:
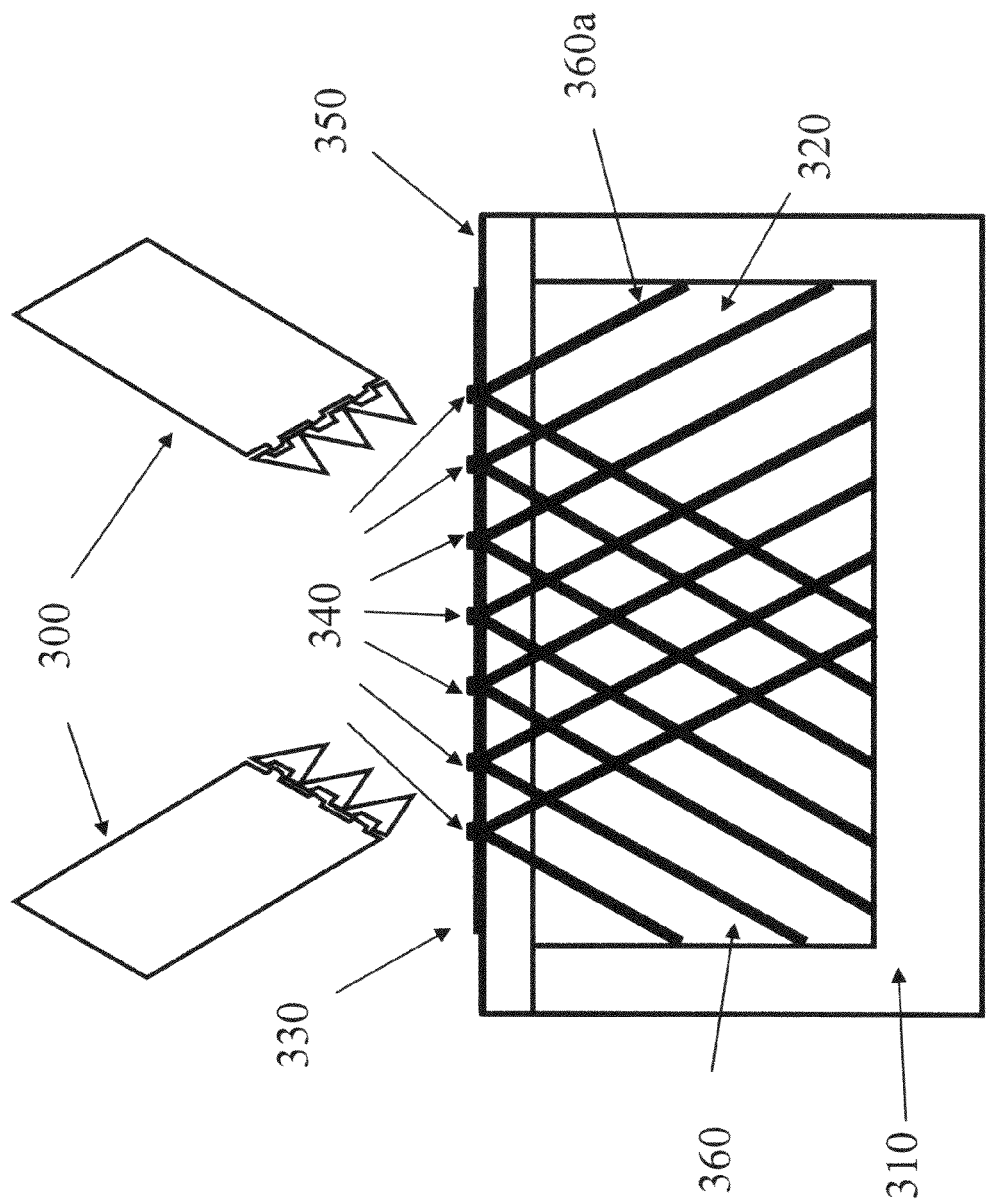
FIG. 3 is a schematic diagram of a system for forming a structure of an embodiment of the present invention from multiple waveguides created using a single collimated beam or multiple collimated beams through multiple apertures.
Figure 4B:
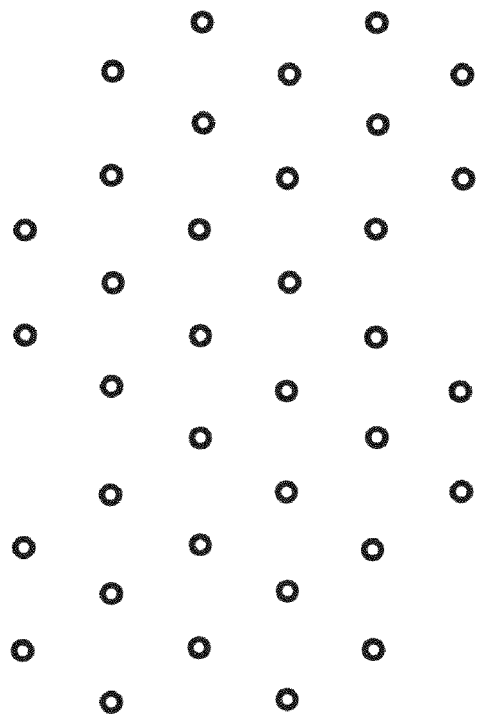
FIG. 4b illustrates an example of a hexagonal mask pattern (or a hexagonal mask aperture pattern) according to embodiments of the present invention.
Figure 4A:
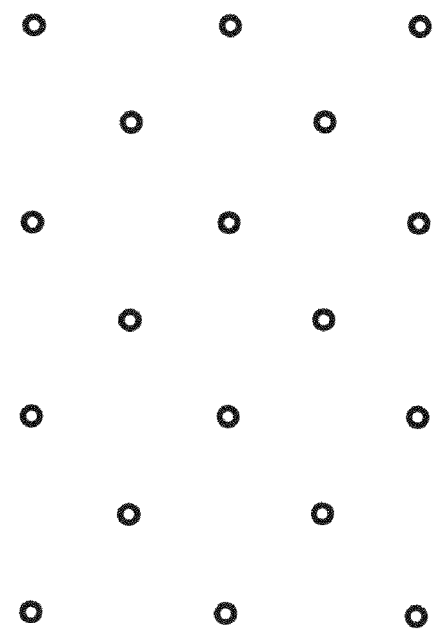
FIG. 4a illustrates an example of a square mask pattern (or a square mask aperture pattern) according to embodiments of the present invention.

With reference to FIG. 3, a system for forming a 3D polymer microstructure according to an embodiment of the present invention includes one or more collimated light sources 300, a reservoir (mold) 310 having a volume of monomer 320 that will polymerize at a wavelength of collimated light beams provided by the light sources 300, and a patterning apparatus, such as a mask 330 with multiple apertures (open areas) 340. Each of the apertures 340 has a given shape and dimension substantially matching a cross section geometry of a waveguide (e.g., waveguide 360a). Between the mask 330 and the monomer 320, there may be a substrate 350. Here, in FIG. 3, a truly 3D network can be formed because the intersecting polymer waveguides 360 will simply polymerize together, but will not interfere with waveguide propagation. Also, the spacing between the plurality of waveguides 360 corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 formed from each of the apertures 340 will determine the open volume fraction (i.e. open space) of the formed 3D microstructure.

As such, through the system of FIG. 3, a 3D microstructure (or a 3D ordered polymer microstructure) of an embodiment of the present invention can be designed for a given application. The design parameters include: 1) the angle and pattern of the polymer waveguides with respect to one another, 2) the packing, or relative density of the resulting cellular structure (or the open volume fraction), and 3) the cross-sectional shape and dimensions of the polymer waveguides.

Figure 5:
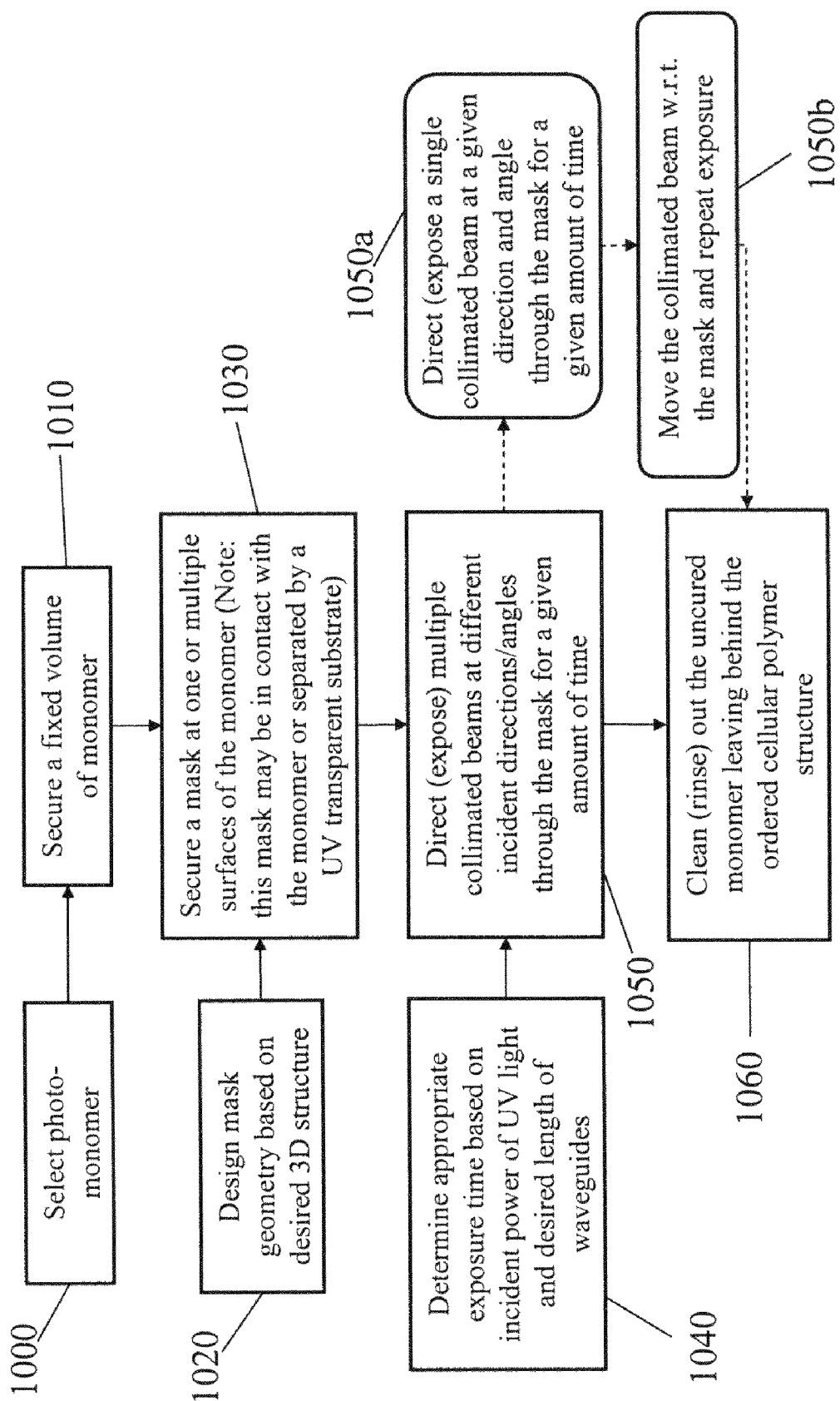
FIG. 5 is a process flow diagram for forming one or more polymer waveguides of a structure according to an embodiment of the present invention.

In more detail, FIG. 5 shows a method of forming a 3D ordered microstructure according to an embodiment of the present invention. As illustrated in FIG. 5, a photo-monomer is selected in block 1000. In block 1010, a volume of the selected photo-monomer is secured (e.g., in a reservoir). A mask geometry is designed based on a desired 3D structure in block 1020. A patterning apparatus, such as a mask having the designed geometry, is secured in block 1030. Here, the secured mask has at least one aperture between at least one collimated light source and the volume of the selected photo-monomer. In addition, the mask may be in contact with the monomer or separated by a substrate (e.g., by a UV transparent substrate).

In block 1040, an appropriate exposure time is determined based on incident power of a collimated light beam from the at least one collimated light source (e.g., an incident power of a UV light) and a desired length of one or more waveguides. The collimated light beam from the at least one collimated light source is directed to the mask for a period of exposure time so that a portion of the collimated beam passes through the mask and is guided by the at least one aperture into the photo-monomer to form at least one waveguide through a portion of the volume of the photo-monomer. Here, the at least one waveguide has a cross sectional geometry substantially matching the designed aperture geometry on the mask.

In one embodiment as shown in block 1050, multiple collimated beams at different incident directions and/or angles are directed through the mask for a given amount of time.

Alternatively, as shown in blocks 1050a, a single collimated beam at a given direction and angle is directed through the mask for a given amount of time. Then, at block 1050b, the collimated light beam is moved with respect to the mask and the exposure is repeated.

Then, at block 1060, any uncured photo-monomer is removed to leave behind a 3D ordered polymer microstructure. Here, in one embodiment, the plurality of polymer waveguides are used to form the 3D ordered polymer microstructure, and the 3D ordered polymer microstructure corresponds with the pattern of the plurality of apertures.

The resulting 3D polymer microstructure can be formed in seconds in the area where exposed to the incident collimated beam. Since the incident light and the monomer remain fixed with respect to one another during the formation of a polymer waveguide, the exposure area of the collimated beam(s) can be scanned over a larger surface area of monomer, leading to the formation of large-area structures. Alternatively, in one embodiment, a volume of monomer can continuously be fed under a fixed incident light pattern (created from a mask and collimated light) leading to a path for mass production.

As described, once the polymer cellular structure is formed in the volume of monomer, the remaining un-polymerized material (monomer) is removed leaving an open cellular polymer material that is the ordered 3D microstructure. By way of example, a solvent that dissolves the monomer (but not the polymer) may be used to aid in the monomer removal.

With reference back to FIGS. 1 and 2, the truss elements 12, 14, 16 of the structure 10 define an open volume (i.e. free space) of the structure 10. In one embodiment, the structure 10 defines a free space of not less than about 40% by volume and not greater than about 99% by volume. In another embodiment, the structure 10 defines a free space of not less than about 70% by volume and not greater than about 95% by volume.

The truss elements 12, 14, 16 intersect at the nodes 18 to form symmetrical angles in three dimensions (three orthogonal directions). The symmetrical angles relative to the xz-plane (see, FIG. 1), can measure between 0° and 90°. That is, truss elements 12, 14, 16 interpenetrate each other to form "perfect" nodes: each of the truss elements 12, 14, 16 defines an angle relative to a compression surface of the structure 10 (e.g. a surface extending along a direction of the xz-plane), and the respective angles defined by the truss elements 12, 14, 16 are substantially equal to one another. However, embodiments of the present invention are not limited thereto.

The truss elements 12, 14, 16 have an intrinsically high strength due to their small scale. In one embodiment, each of the truss elements 12, 14, 16 has an axial diameter of not greater than about 500 μm.

In another embodiment, each of the truss elements 12, 14, 16 has an axial diameter of not greater than about 200 μm. In another embodiment, each of the truss elements 12, 14, 16 has an axial diameter of not greater than about 10 μm. The truss elements 12, 14, 16 are configured to have a correspondingly small aspect ratio (e.g., length/diameter ratio) for withstanding a bending moment. Here, each of the truss elements 12, 14, 16 has a length not greater than 100 μm such that the truss elements can better withstand an mechanical load applied to the structure 10. As such, the truss elements 12, 14, 16 experience little, if any, bending deformation during application of the mechanical load to the structure 10.

At certain size scales (e.g., the size scales described above), the strength of the truss elements is increased, which corresponds to an increased strength of the structure 10. In one embodiment, each of the truss elements 12, 14, 16 has molecular alignment extending along an axial direction of the truss element. As such, an anisotropic material is produced, which provides a substantial degree of stiffness and/or strength along the axial direction. In one embodiment, in a material that is composed of long molecular chains (e.g., polymers), the molecules thereof can be aligned along a direction to provide an increased degree of mechanical strength and/or stiffness along the alignment direction. In more detail, where the molecular alignments of the truss elements 12, 14, 16 extend along the corresponding axial directions, the truss elements 12, 14, 16 are configured to axially transfer a mechanical load applied to the structure 10.

As described above, the structure 10 withstands the mechanical load, e.g., via axial tension and compression of the truss elements 12, 14, 16. Molecular alignment of the truss elements 12, 14, 16 along their respective axial directions lends additional strength and/or stiffness to the truss elements 12, 14, 16 and, accordingly, also to the structure 10.

In one embodiment, the truss elements 12, 14, 16 are configured to provide the structure 10 with a stretch-dominated behavior under a compression load applied to the structure 10. Such stretch-dominated behavior is contrasted from the bending-dominated behavior (e.g. of randomly oriented cellular structures), as described in Ashby, "The Properties Of Foam And Lattices," Philosophical Transactions—Royal Society Of London Series A Mathematical Physical And Engineering Sciences, Vol. 364, 2006, which is incorporated by reference herein in its entirety.

In a bending-dominated structure, the elastic modulus is proportional to the square of the relative density $\rho'/\rho_s'$, where $\rho'$ is the density of the cellular material and $\rho_s'$ is the density of the solid from which it is constructed. In contrast, a stretch-dominated structure (such as structure 10), has a compressive elastic modulus (E) directly proportional to both the relative density thereof and the modulus ($E_s$) of the solid material portion of the structure 10, as expressed in equation (1) below:

$$E = E_s (\sin^4\theta)(\rho/\rho_s) \qquad (1)$$

where $\rho$ is a density of the structure 10, $\rho_s$ is a density of a solid material portion of the structure 10, $\theta$ is an angle of at least one of the truss elements 12, 14, 16 relative to a compression surface of the structure 10, and $E_s$ is a modulus of the solid material portion of the structure 10. As such, the elastic modulus of a structure of embodiments of the present invention is also proportional to a geometric function of the angle $\theta$ of the structure, and $\theta$ can accordingly be chosen to vary (e.g., increase or reduce) the elastic modulus.

Figure 6:
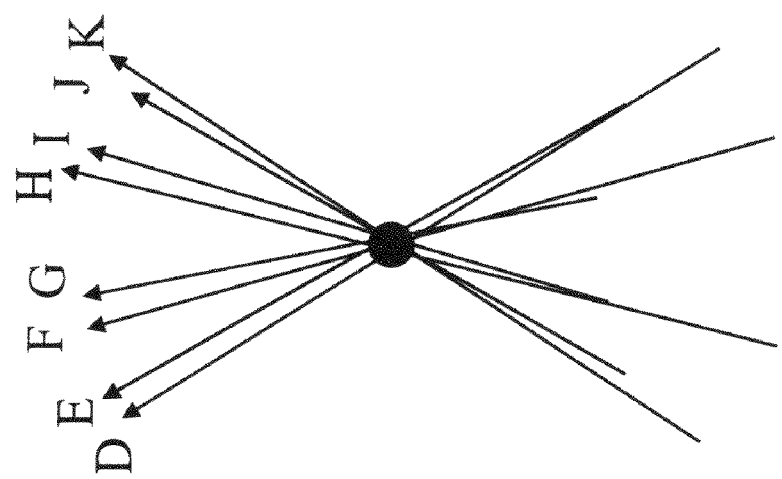
FIG. 6 is a perspective schematic view showing respective directions along which truss elements of a structure of an embodiment of the present invention extend.

With reference back to FIGS. 1 and 2, the structure 10 includes truss elements 12, 14, 16 respectively extending along A, B, and C directions. However, embodiments of the present invention are not limited thereto. For example, with reference to FIG. 6, a structure of an embodiment of the present invention may include truss elements defined by self-propagating polymer waveguides and extending along D, E, F, G, H, I, J and K directions, respectively. For example, a structure according to an embodiment of the present invention may include eight truss elements, each of which extends along a corresponding one of eight varying directions. Here, similar to the embodiment shown in FIGS. 1 and 2, the eight truss elements interpenetrate each to form nodes of a continuous material. However, embodiments of the present invention are not limited thereto, and may include more or fewer than eight truss elements.

In a further embodiment of the present invention, an open volume of a cellular structure is filled at least partially with a material different from the material of the cellular structure itself, thereby creating an ordered bi-phase composite. Also in a further embodiment of the present invention, one or more truss elements of a cellular structure are coated with a material different from the material of the cellular structural itself to adjust the thermal behavior thereof. Also in a further embodiment of the present invention, base elements of a cellular structure are coated with a material different from the material of the cellular structural itself, and the base elements are removed to create a self-supporting structure having continuous but separated volumes.

The size scale and the features of structures of embodiments of the present invention can be utilized in heat transfer applications.

In one embodiment of this invention, an apparatus for storing thermal energy includes (or is fabricated with) a three-dimensional ordered open-cellular structure as a polymer scaffold. The geometry for the polymer scaffold according to an embodiment of the present invention is shown in FIG. 2 as described above. Here, in one embodiment, the truss elements (or rods) 12, 14, 16 that make up the structure (or scaffold) 10 ranges from about 10 μm to about 0.5 mm (from 10 10 μm to 0.5 mm) in diameter. While the truss elements 12, 14, 16 for the scaffold 10 in FIG. 2 are shown to be interpenetrating, the present invention is not thereby limited. For example, the truss elements (or rods) could all be parallel as well. Once the structure 10 is formed, it can be made into a heat exchanger or heat storage composite as described in more detail below.

According to one embodiment of the present invention, to fabricate a heat storage composite, the polymer is heat treated to increase rigidity. Next, it is coated with a metal or ceramic to increase thermal conduction and/or rigidity, and then it is filled with a phase change material. Examples of suitable phase change materials are hydrocarbons, organic molecules, fatty acids, and salt hydrates with melting temperatures ranging from −20 and 200° C. Additional phase change materials can be found in Applied Thermal Engineering 23 (2003)251-283, which is incorporated by reference herein in its entirety. In one embodiment, the scaffold is chemically treated to make it hydrophobic or hydrophilic to aid incorporation of the phase change material. Examples of treatment chemicals are silanes, surfactants, or amphoteric polymers. Additionally, in one embodiment, a layer of metal or ceramic is applied on the surface of the scaffold to change the surface polarity and increase impregnation of heat storage materials.

Figure 7:
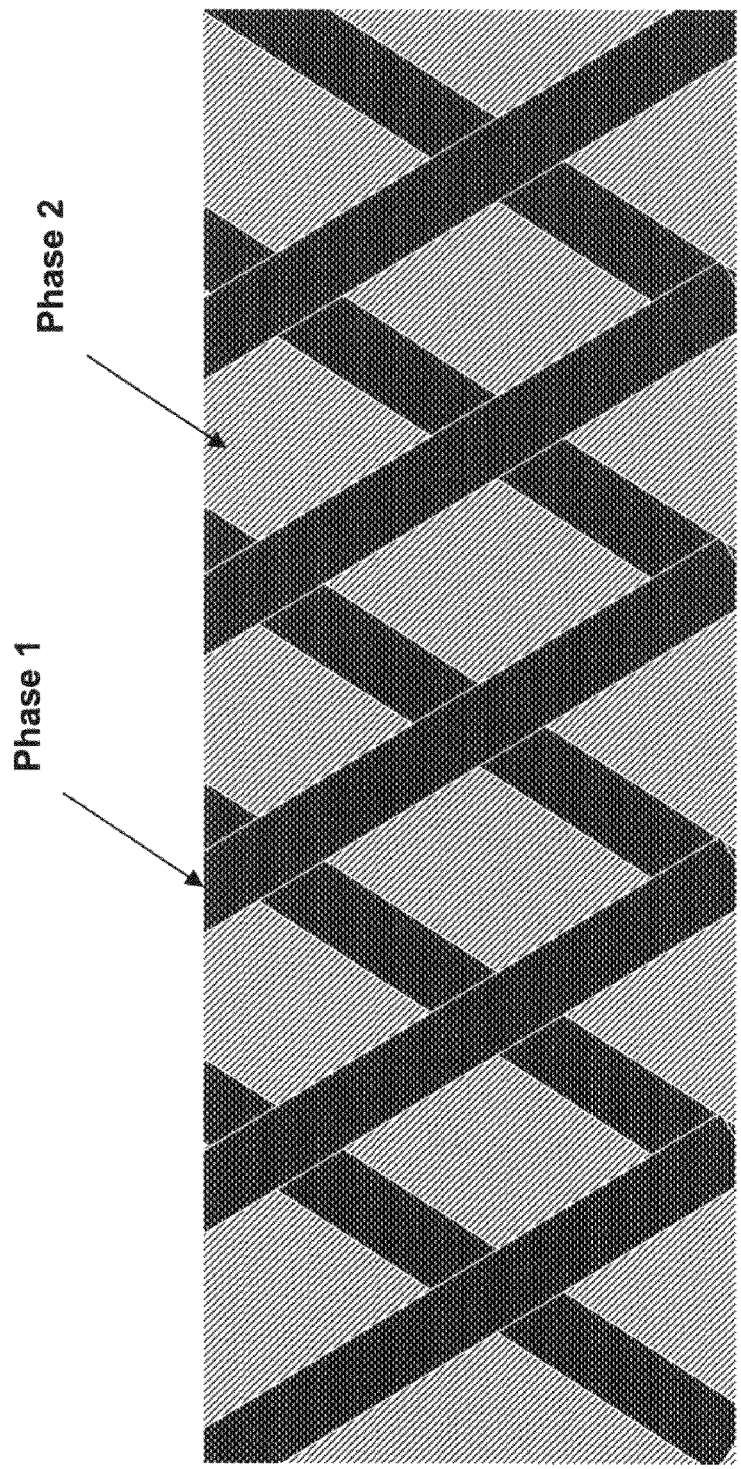
FIG. 7 is a schematic view showing a structure of a phase change material filled composite according to an embodiment of the present invention.
Figure 8:
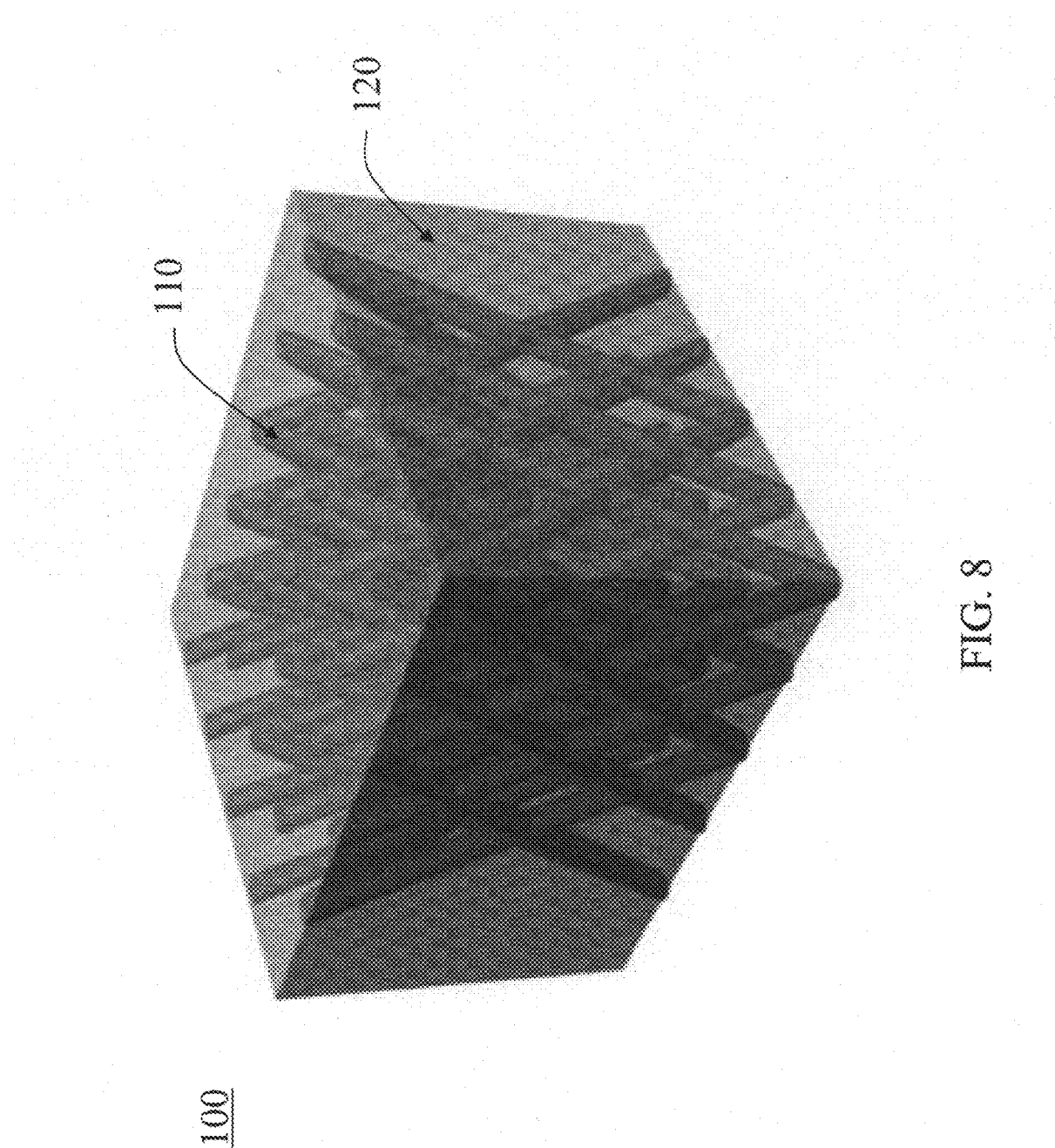
FIG. 8 is a perspective schematic view showing an apparatus for storing thermal energy according to an embodiment of the present invention.

FIGS. 7 and 8 show the structure of a phase change material filled composite according to an embodiment of the present. Here, Phase 1 is the polymer scaffold and Phase 2 is the phase change or heat storage material.

Figure 9:
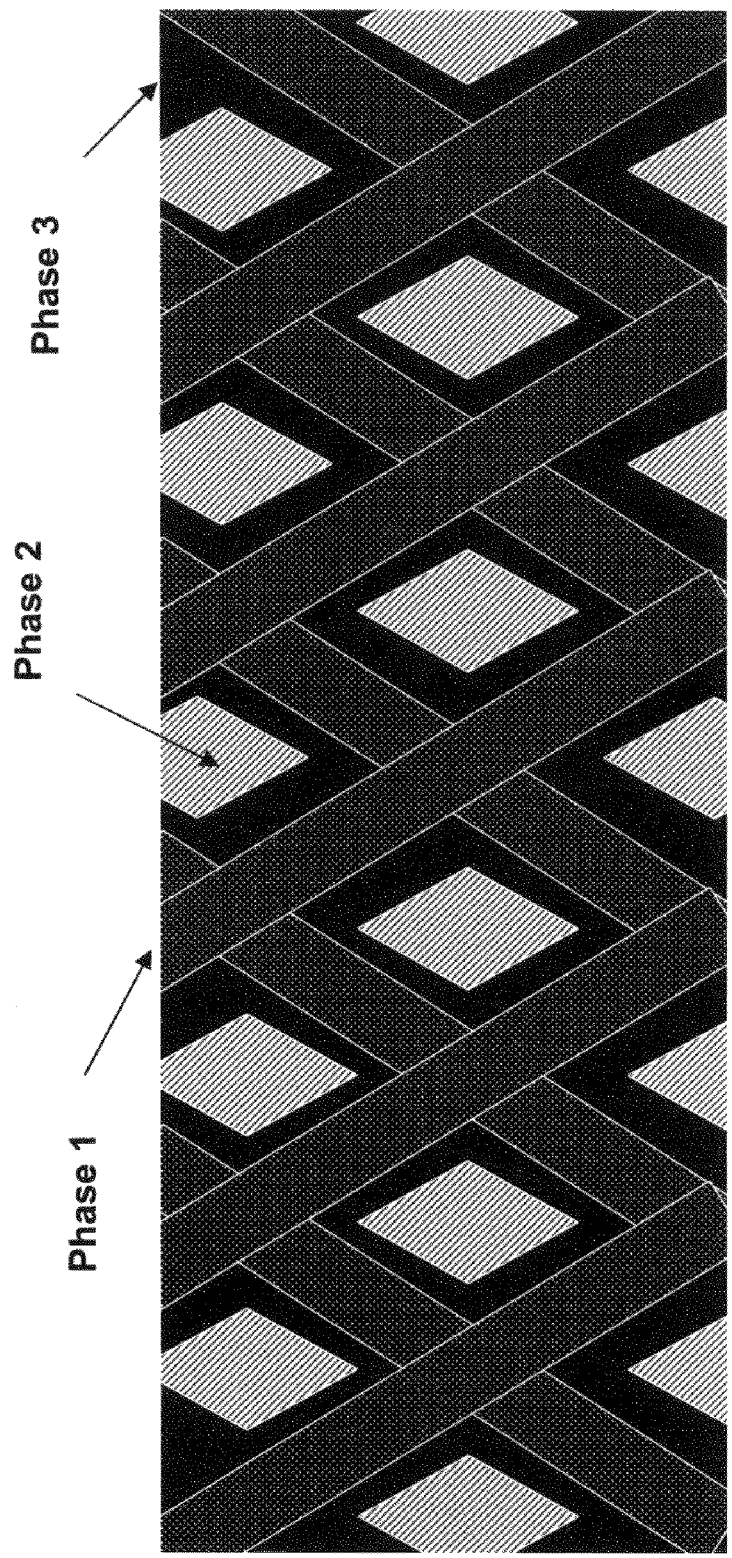
FIG. 9 is a schematic view showing a structure where a polymer scaffold is coated with a metal or ceramic layer according to an embodiment of the present invention.

FIG. 9 shows an embodiment where the polymer scaffold is coated with a metal or ceramic layer. In this case, Phase 1 is the polymer scaffold, Phase 2 is the phase change or heat storage material, and Phase 3 is the metal or ceramic coating of the polymer scaffold.

The following examples of heat storage composites represent the present invention in more detail. However, the present invention is not limited by these examples.

EXAMPLE 1

1. A 0.142 g section of a polymer scaffold was weighed out.
2. Capric acid (also known as decanoic acid) is placed in a small Petri dish and heated to 40° C. until melted.
3. The polymer scaffold is submerged in the molten capric acid until it is fully filled. Then it is removed and placed on a weighing dish to dry.
4. Any extra capric acid is scraped away with a razor blade.

After incorporation, the composite had a mass of 0.880 g, corresponding to a material that is 84% by mass capric acid. Since the heated polymer has a density of 1.26 g/cm$^3$ and capric acid has a density of 0.893 g/cm$^3$, this corresponds to a scaffold that is 88 vol % capric acid and 16 vol % polymer scaffold. Top and side views of this composite are shown in FIGS. 10a and 10b, respectively.

Figure 10B:
FIGS. 10a and 10b respectively are top and side views of a composite according to Example 1.
Figure 10A:

The images in FIG. 10a and 10b show a well-filled composite material. Here, the side view in FIG. 10b shows a vertical cut through the material, which is why a hexagonal pattern of scaffold rods is observed in the capric acid.

Figure 11:
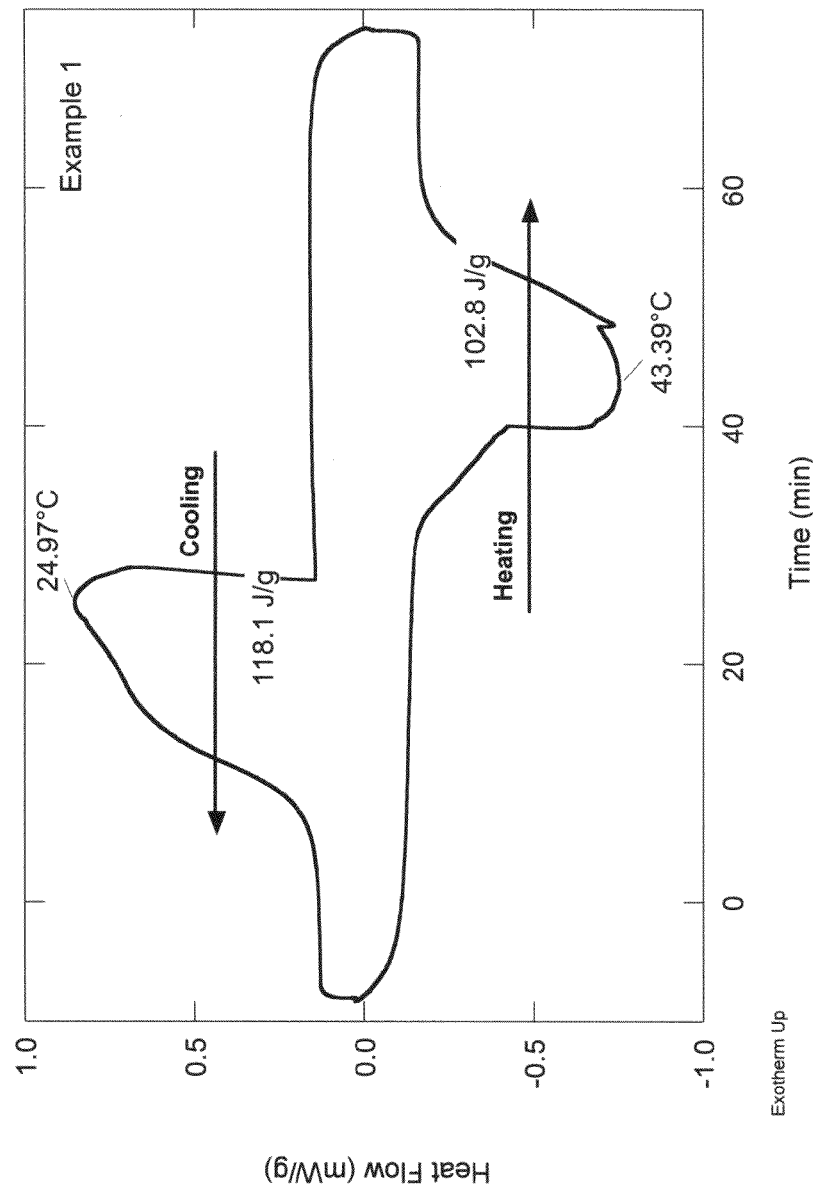
FIG. 11 is a heat flow versus time graph showing that the structure of Example 1 has an endotherm at 44° C.

A small piece of composite was heated from −10° C. to 70° C. and then cooled back to −10° C. at 5° C./min in a differential scanning calorimeter (TA Instruments DSC 2910). The data in FIG. 11 shows an endotherm at 44° C. corresponding to the melting of capric acid.

The endotherm shows that the composite has a latent heat of melting of 103 J/g. Since pure capric acid was found to have an enthalpy of melting of 153 J/g and since the composite is 84 wt % capric acid, the energy absorption capacity of the composite implies a 67 wt % filling. Thus, the scaffold was not uniformly filled and the differential scanning calorimetry (DSC) is probably of a less filled piece of material. The freezing transition occurs during cooling at 25° C. and has an energy of −118 J/g, which is similar in magnitude to the melting transition as expected. A temperature hysteresis is observed, which may be due to the fast heating and cooling rates. The same hysteresis is seen in a DSC of pure capric acid.

EXAMPLE 2

1. 0.080 g of a rigid graphite scaffold is weighed out
2. Capric acid (also known as decanoic acid) is placed in a small Petri dish and heated to 40° C. until melted.
3. The polymer scaffold is submerged in the molten capric acid until it is fully filled. Then it is removed and placed on a weighing dish to dry.
4. Any extra capric acid is scraped away with a razor blade.

After incorporation, the composite had a mass of 0.141 g, corresponding to a material that is 43% by mass capric acid. Since graphite has a density of 2.2 g/cm$^3$ and capric acid has a density of 0.893 g/cm3, this corresponds to a scaffold that is 65 vol % capric acid and 35 vol % polymer scaffold. Top and side views of this composite are shown in FIGS. 12a and 12b, respectively.

Figure 12B:
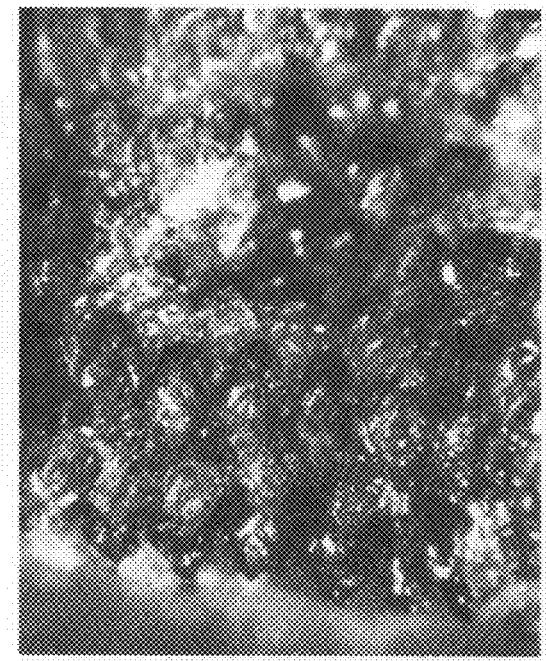
FIGS. 12a and 12b respectively are top and side views of a composite according to Example 2.
Figure 12A:
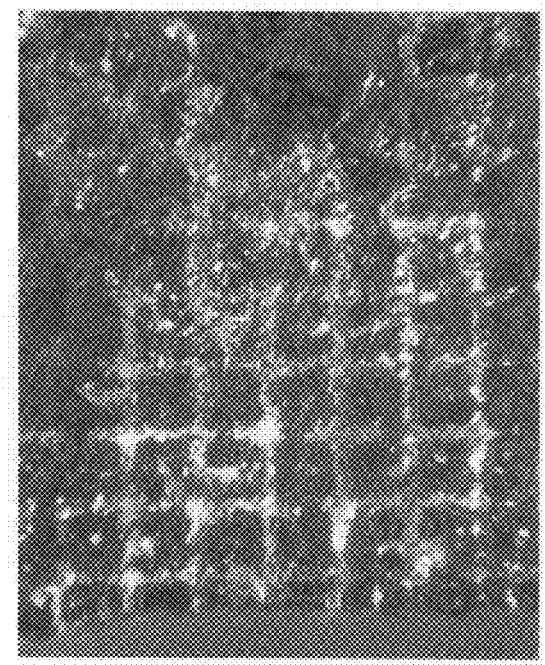

The images in FIGS. 12a and 12b show a well-filled composite material. Here, the side view in FIG. 12b shows a vertical cut through the material, which is why the crosshatch pattern of the scaffold is observed.

Figure 13:
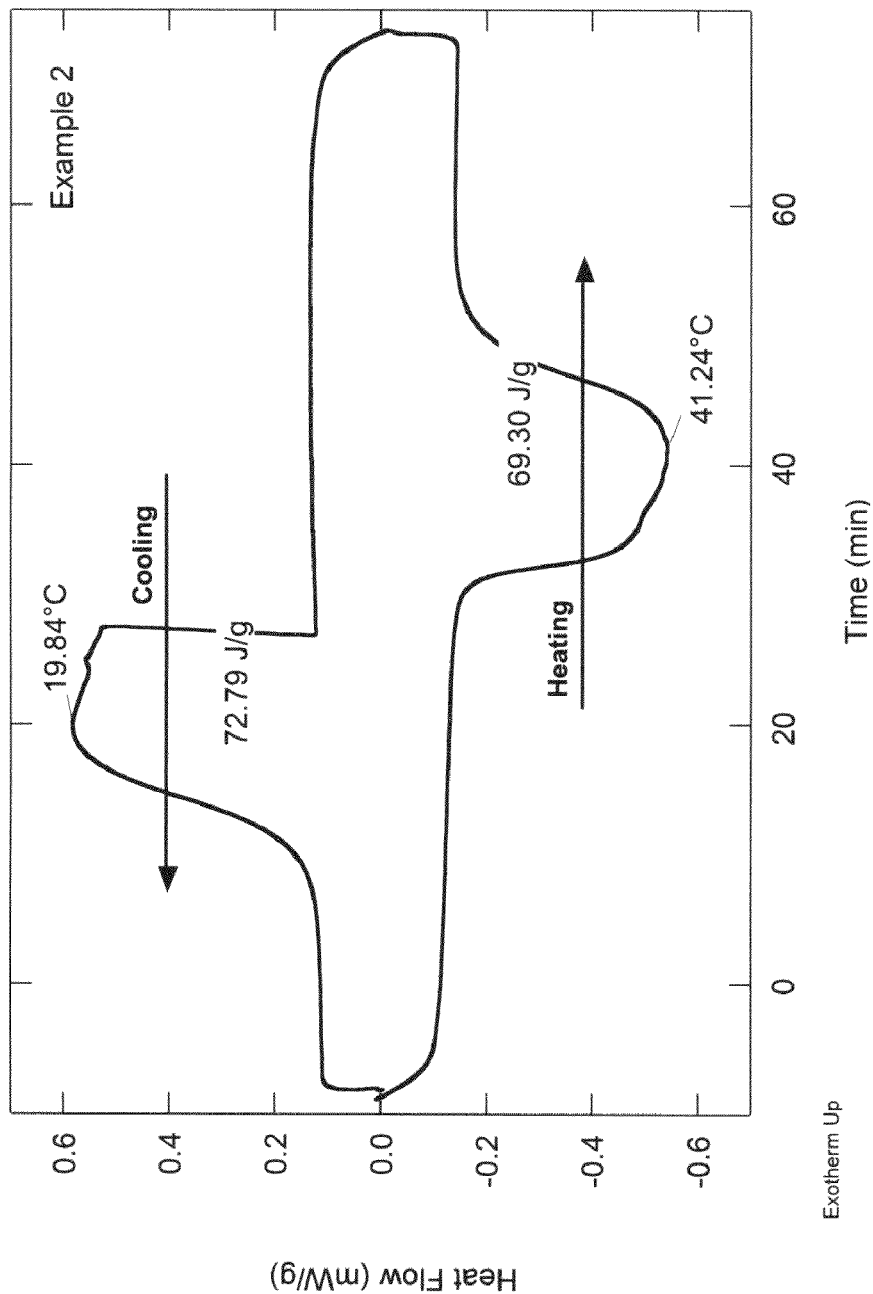
FIG. 13 is a heat flow versus time graph showing that the structure of Example 2 has an endotherm at 41° C.

This composite was heated from −10° C. to 70° C. and then cooled back to −10° C. at 5° C./min in a TA Instruments DSC 2910. The data in FIG. 13 shows an endotherm at 41° C. corresponding to the melting of capric acid.

The endotherm shows that the composite has a latent heat of melting of 69 J/g. Since pure capric acid was found to have an enthalpy of melting of 153 J/g and since the composite is 43 wt % capric acid, the energy absorption capacity of the composite implies a 45 wt % filling which agrees well with the expected value. The freezing transition occurs during cooling at 20° C. and has an energy of −73 J/g, which is very similar in magnitude to the melting transition as expected. A temperature hysteresis is observed, which may be due to the fast heating and cooling rates. The same hysteresis is seen in a DSC of pure capric acid.

EXAMPLE 3

1. A polymer scaffold and paraffin wax are placed in a vacuum bag.
2. The bag is heated to 65° C. to melt the paraffin wax, and vacuum is applied to pull the paraffin through the scaffold structure.

If a scaffold with 90% of its volume being free space is used and it fills completely with wax, this composite will absorb 137 J/g of heat as a result of the paraffin wax melting.

EXAMPLE 4

1. A Ni coated polymer scaffold is mixed with erythritol in a petri dish.
2. The mixture is heated to 120° C. to melt the erythritol, and the scaffold absorbs the erythritol into the free space through capillary filling. The composite is then removed and allowed to dry.

If a 90% free space scaffold is used in this composite and the composite fills completely, this material will absorb 286 J/g of heat as a result of erythritol melting.

EXAMPLE 5

1. A copper scaffold and capric acid (also known as decanoic acid) are placed in a vacuum bag.
2. The bag is heated to 35° C. to melt the capric acid, and a vacuum is applied to pull the capric acid through the scaffold structure.

If a 90% free space scaffold is used, this composite will absorb 120 J/g of heat as a result of capric acid melting.

EXAMPLE 6

1. A polymer scaffold and $CaCl_2.6H_2O$ are mixed together.
2. The mixture is heated to 35° C. to melt the $CaCl_2.6H_2O$, and the scaffold absorbs the molten $CaCl_2.6H_2O$ into the free space through capillary filling. The composite is then removed and allowed to dry.

If a 90% free space scaffold is used, this composite will absorb 167 J/g of heat as a result of $CaCl_2.6H_2O$ melting.

Figure 14:
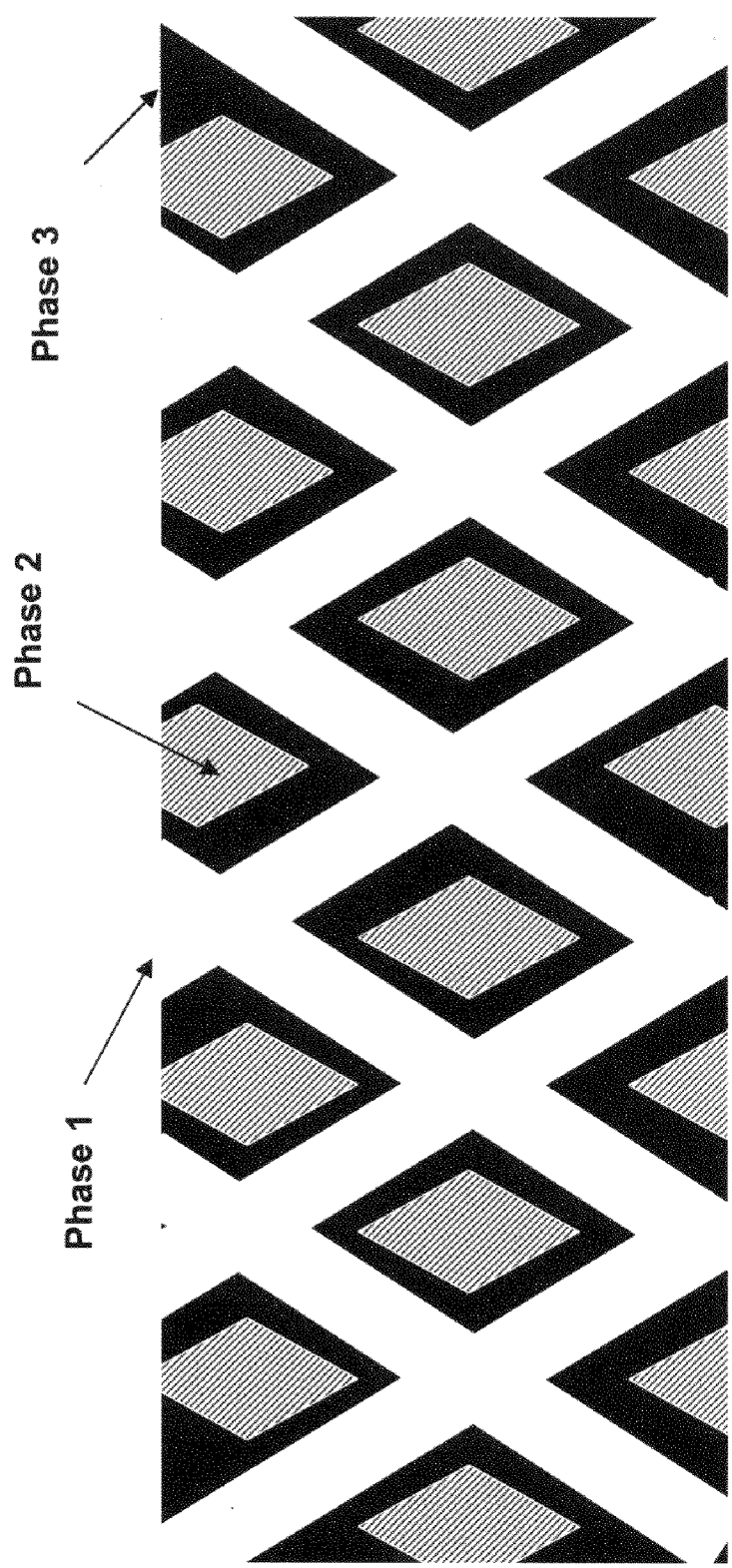
FIG. 14 is a schematic view showing a structure of a heat exchanger according to an embodiment of the present invention.

Heat Exchanger:

To fabricate a heat exchanger according to one embodiment of the present invention, the space surrounding a scaffold made of metal or ceramic tubes is filled with a liquid or phase change material. This structure is shown in FIG. 14 where Phase 1 is a gas or a liquid containing heat to be removed that is flowed through the heat exchanger, Phase 2 is a phase change/heat storage material, a liquid, or air, and Phase 3 is the metal or ceramic coating. Phase 2 will remain stationary or flow through the material.

Figure 15:
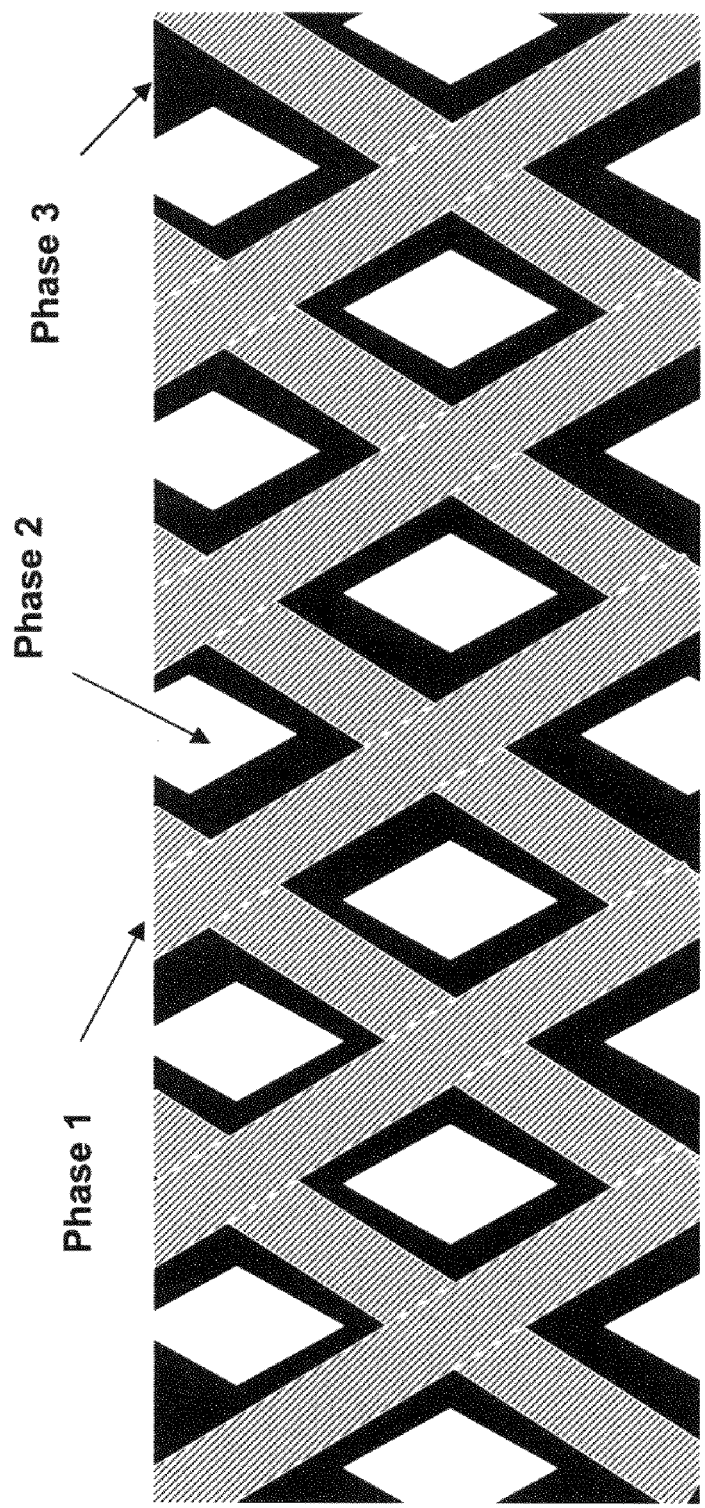
FIG. 15 is a schematic view showing a structure of a heat exchanger according to another embodiment of the present invention.

Referring to FIG. 15, an alternative method to fabricate a heat exchanger according to another embodiment of the present invention is to incorporate a phase change material, gas, or liquid into the inside of the scaffold made of metal or ceramic tubes. In FIG. 15, this structure is shown where Phase 1 is a phase change/heat storage material, a liquid, or air, Phase 2 is air or a liquid containing heat to be removed that is flowed through the heat exchanger, and Phase 3 is the metal or ceramic coating.

The following examples of process to fabricate a heat exchanger represent the present invention in more detail. However, the present invention is not limited by these examples.

EXAMPLE 7

1. A ceramic scaffold made of hollow rods is sealed at the top and bottom with tape to block the tubes, and then it is mixed with paraffin wax.

2. The scaffold and paraffin wax are heated to 65° C. to melt the paraffin wax, and the scaffold absorbs the molten wax.

3. The tape is removed, and the ceramic tubes form the air pathways for the heat exchanger.

EXAMPLE 8

1. A copper scaffold made of hollow rods is sealed at the top and bottom with a kapton sheet. Holes are made to allow air to pass through the hollow tubes making up the scaffold.

2. Water is flowed through the open space to remove heat from the hollow rods as hot air passes through them.

Referring back to FIG. 8, an apparatus 100 for storing thermal energy according to an embodiment of the present invention is shown. Here, the apparatus 100 includes a thermal storage material 120 and a three-dimensional structure 110. The three-dimensional structure 110 includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. The first, second, and third truss elements interpenetrate each other at a plurality of nodes to form a continuous material. The first, second, and third truss elements define an open space. The thermal storage material 120 occupies at least a portion of the open space, and the three-dimensional structure 110 is self-supporting.

At least one of the first, second, or third truss elements may include a chemically treated surface.

The chemically treated surface may include a material selected from the group consisting of a silane treated surface, a surfactant treated surface, and an amphoteric polymer treated surface.

The apparatus 100 may further include a metal layer coating at least one portion of at least one of the first, second, or third truss elements and adapted to change a surface polarity of the at least one portion of the at least one of the first, second, or third truss elements.

The metal layer may include a material selected from the group consisting of nickel (Ni), copper (Cu), gold (Au), silver (Ag), ruthenium (Ru), platinum (Pt), rhodium (Rh), cobalt (Co), iron (Fe), and zinc (Zn).

The apparatus 100 may further include a ceramic layer coating at least a portion of at least one of the first, second, or third truss elements and adapted to change a surface polarity of the at least one portion of the at least one of the first, second, or third truss elements.

The ceramic layer may include a material selected from the group consisting of silicon oxycarbide (SiOC), silicon carbide (SiC), silicon nitride (SiN), hafnium carbide (HfC), chromium carbide (CrC), boron nitride (B4N), cubic boron nitride (c-BN), hexagonal boron nitride (h-BN), and amorphous boron nitride (α-BN).

The thermal storage material 120 may include a phase change material.

The phase change material may have a phase change characteristic at a temperature from about −20° C. to about 200° C.

The thermal storage material 120 may include an organic material having a phase change characteristic at a temperature from about −20° C. to about 200° C.

The organic material may include a material selected from the group consisting of a hydrocarbon, a fatty acid, and a paraffin wax.

The thermal storage material 120 may include a salt hydrate having a phase change characteristic at a temperature from about 0° C. to about 150° C.

The salt hydrate may have a molecular formula of $A^y B^{-x} \cdot zH_2O$, wherein A is a cation having a charge of y, B is an anion having a charge of −x, and z is an integer greater than or equal to 1.

The first, second, and third truss elements may be adapted to axially transfer a mechanical load applied to the apparatus.

Each of the first, second, and third truss elements may have an axial diameter from about 10 μm to about 0.5 mm.

According to another embodiment of the present invention, a method of forming an apparatus for storing thermal energy includes: securing a volume of a photo-monomer; securing a mask between at least one collimated light source and the volume of the photo-monomer, the mask having a plurality of apertures; directing a collimated light beam from the at least one collimated light source to the mask for a period of exposure time so that a portion of the collimated light beam passes through the mask and is guided by the plurality of apertures into the photo-monomer to form a plurality of waveguides through a portion of the volume of the photo-monomer; removing any uncured photo-monomer to leave behind a three-dimensional ordered polymer microstructure; and placing a thermal storage material at an open space of the three-dimensional ordered polymer microstructure.

Figure 16:
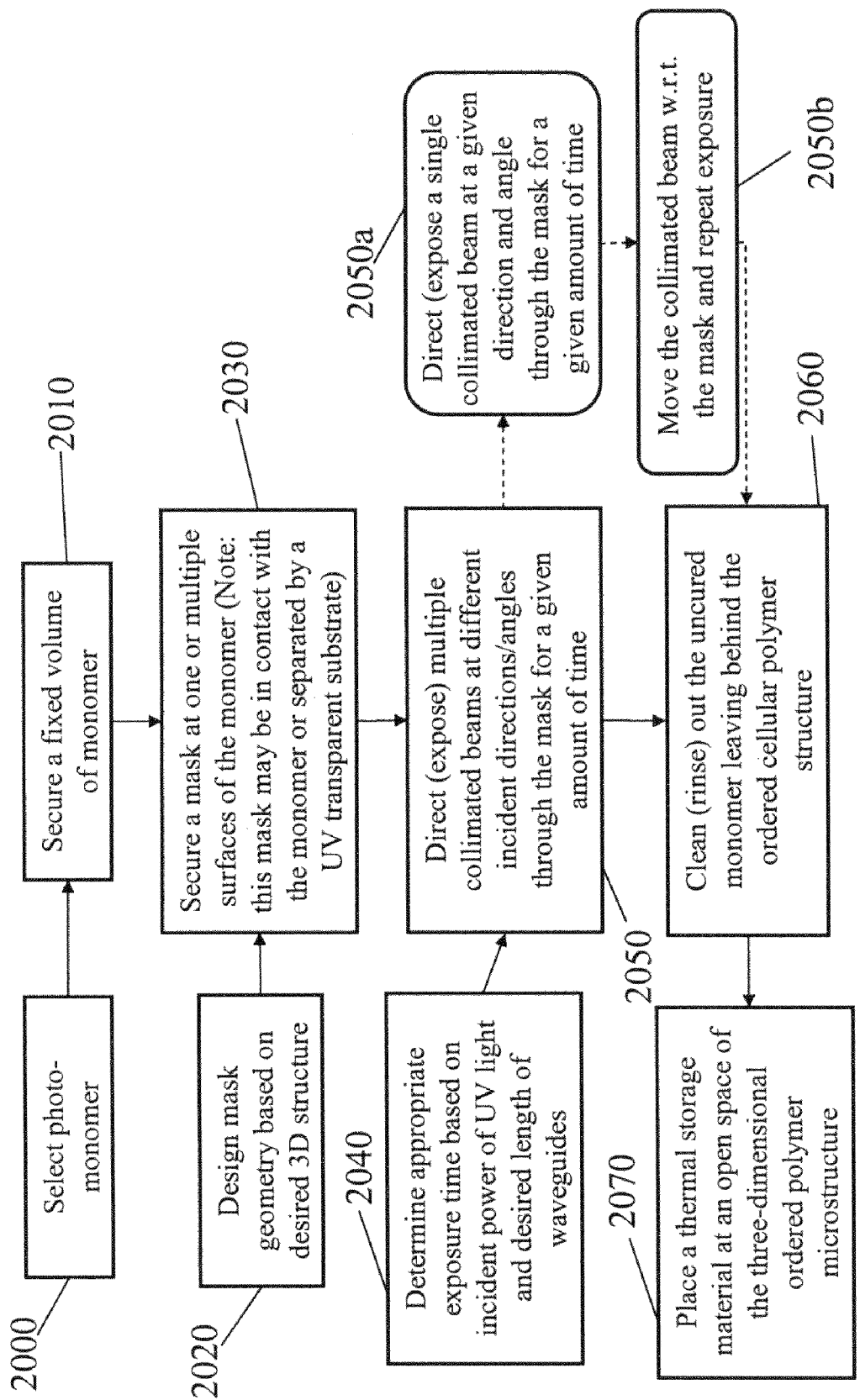
FIG. 16 is a process flow diagram for forming an apparatus for storing thermal energy according to another embodiment of the present invention.

FIG. 16 shows a method of forming an apparatus for storing thermal energy according to an embodiment of the present invention. As illustrated in FIG. 16, a photo-monomer is selected in block 2000. In block 2010, a volume of the selected photo-monomer is secured (e.g., in a reservoir). A mask geometry is designed based on a desired 3D structure in block 2020. A patterning apparatus, such as a mask having the designed geometry, is secured in block 2030. Here, the secured mask has at least one aperture between at least one collimated light source and the volume of the selected photo-monomer. In addition, the mask may be in contact with the monomer or separated by a substrate (e.g., by a UV transparent substrate).

In block 2040, an appropriate exposure time is determined based on incident power of a collimated light beam from the at least one collimated light source (e.g., an incident power of an UV light) and a desired length of one or more waveguides. The collimated light beam from the at least one collimated light source is directed to the mask for a period of exposure time so that a portion of the collimated beam passes through the mask and is guided by the at least one aperture into the photo-monomer to form at least one waveguide through a portion of the volume of the photo-monomer. Here, the at least one waveguide has a cross sectional geometry substantially matching the designed aperture geometry on the mask.

In one embodiment as shown in block 2050, multiple collimated beams at different incident directions and/or angles are directed through the mask for a given amount of time.

Alternatively, as shown in blocks 2050a, a single collimated beam at a given direction and angle is directed through the mask for a given amount of time. Then, at block 2050b, the collimated light beam is moved with respect to the mask and the exposure is repeated.

At block 2060, any uncured photo-monomer is removed to leave behind a 3D ordered polymer microstructure. Here, in one embodiment, the plurality of polymer waveguides are used to form the 3D ordered polymer microstructure, and the 3D ordered polymer microstructure corresponds with the pattern of the plurality of apertures.

Then, at block 2070, a thermal storage material is placed at an open space of the 3D ordered polymer microstructure.

Here, the method may further include heating the three-dimensional ordered polymer microstructure such that a rigidity thereof is increased.

The method may further include applying a metal layer to at least one portion of at least one of the first, second, or third truss elements, the metal layer being adapted to change a surface polarity of the at least one portion of the at least one of the first, second, or third truss elements.

The method may further include applying a ceramic layer to at least one portion of at least one of the first, second, or third truss elements, the ceramic layer being adapted to change a surface polarity of the at least one portion of the at least one of the first, second, or third truss elements.

The method may further include chemically treating at least one portion of at least one of the first, second, or third truss elements, the chemical treatment being adapted to aid the placing of the thermal storage material.

In view of the foregoing, a heat exchanger according to an embodiment of the present invention includes a supporting scaffold templated by an optically fabricated polymer scaffold. Here, the heat exchanger is a composite material of the scaffold and a heat storage material. The heat exchanger can support a load.

In one embodiment, the polymer scaffold is coated with metal or ceramic. The metal may be Ni, Cu, Au, Ag, Pt, or any other plated or deposited metal. The ceramic may be SiOC, SiC, $Si_3N_4$, HfC, $Cr_3C_2$, $B_4N$, BN (cubic or hexagonal), $Al_2O_3$, $TiB_2$, TiN, $ZrO_2$, or other ceramic. The metal or ceramic coating may act as the polarity control treatment.

In one embodiment, the polymer scaffold is chemically treated to change the surface polarity. The chemical treatment may be silanes, surfactants, or amphoteric polymers.

In one embodiment, the heat exchanger includes metal or ceramic tubes templated from the original polymer scaffold.

In one embodiment, the heat exchanger is filled with a gas, liquid, or solid that absorbs heat.

In one embodiment, the heat exchanger is totally filled or partially filled with an organic molecule or salt hydrate with a phase change temperature between −20 and 200° C.

In one embodiment, the heat storage material may be an organic molecule or salt hydrate. The organic material may have a phase transition that occurs between −20 and 200° C. The organic molecule may contain C, H, N, and O. The organic molecule may be a hydrocarbon or fatty acid. The organic molecule may be a paraffin wax. The salt hydrate may have a phase transition that occurs between 0 and 150° C. The salt hydrate may have the general formula $A^yB^{-x}.zH2O$, wherein A is a cation having a charge of y, B is an anion having a charge of −x, and z is an integer greater than or equal to 1. Upon meting the salt hydrate forms $A^yB^{-x}+zH2O$.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. An apparatus for storing thermal energy, the apparatus comprising:
   a thermal storage material; and
   a three-dimensional structure comprising:
     a plurality of first truss elements defined by a plurality of first self-propagating polymer waveguides and extending along a first direction;
     a plurality of second truss elements defined by a plurality of second self-propagating polymer waveguides and extending along a second direction; and
     a plurality of third truss elements defined by a plurality of third self-propagating polymer waveguides and extending along a third direction;
   wherein the first, second, and third truss elements interpenetrate each other at a plurality of nodes to form a continuous material;
   wherein the first, second, and third truss elements define an open space;
   wherein the thermal storage material occupies at least a portion of the open space; and
   wherein the three-dimensional structure is self-supporting.

2. The apparatus of claim 1, wherein at least one of the first, second, or third truss elements comprises a chemically treated surface.

3. The apparatus of claim 2, wherein the chemically treated surface comprises a material selected from the group consisting of a silane treated surface, a surfactant treated surface, and an amphoteric polymer treated surface.

4. The apparatus of claim 1, further comprising:
   a metal layer coating at least one portion of at least one of the first, second, or third truss elements and adapted to change a surface polarity of the at least one portion of the at least one of the first, second, or third truss elements.

5. The apparatus of claim 4, wherein the metal layer comprises a material selected from the group consisting of nickel (Ni), copper (Cu), gold (Au), silver (Ag), ruthenium (Ru), platinum (Pt), rhodium (Rh), cobalt (Co), iron (Fe), and zinc (Zn).

6. The apparatus of claim 1, further comprising:
   a ceramic layer coating at least a portion of at least one of the first, second, or third truss elements and adapted to change a surface polarity of the at least one portion of the at least one of the first, second, or third truss elements.

7. The apparatus of claim 1, wherein the ceramic layer comprises a material selected from the group consisting of silicon oxycarbide (SiOC), silicon carbide (SiC), silicon nitride (SiN), hafnium carbide (HfC), chromium carbide (CrC), boron nitride ($B_4N$), cubic boron nitride (c-BN), hexagonal boron nitride (h-BN), and amorphous boron nitride (α-BN).

8. The apparatus of claim 1, wherein the thermal storage material comprises a phase change material.

9. The apparatus of claim 8, wherein the phase change material has a phase change characteristic at a temperature from about −20° C. to about 200° C.

10. The apparatus of claim 1, wherein the thermal storage material comprises an organic material having a phase change characteristic at a temperature from about −20° C. to about 200° C.

11. The apparatus of claim 10, wherein the organic material comprises a material selected from the group consisting of a hydrocarbon, a fatty acid, and a paraffin wax.

12. The apparatus of claim 1, wherein the thermal storage material comprises a salt hydrate having a phase change characteristic at a temperature from about 0° C. to about 150° C.

13. The apparatus of claim 12,
wherein the salt hydrate has a molecular formula of $A^y B^{-x} \cdot zH_2O$;
wherein A is a cation having a charge of y;
wherein B is an anion having a charge of −x; and
wherein z is an integer greater than or equal to 1.

14. The apparatus of claim 1, wherein the first, second, and third truss elements are adapted to axially transfer a mechanical load applied to the apparatus.

15. The apparatus of claim 1, wherein each of the first, second, and third truss elements has an axial diameter from about 10 μm to about 0.5 mm.

* * * * *